United States Patent

[11] 3,577,710

| [72] | Inventor | Elliot I. Feldman<br>2850 E. Second St., Tucson, Ariz. 85716 |
|---|---|---|
| [21] | Appl. No. | 763,903 |
| [22] | Filed | Sept. 30, 1968 |
| [45] | Patented | May 4, 1971 |

[54] AIR-TREATMENT APPARATUS
3 Claims, 4 Drawing Figs.

[52] U.S. Cl.................................................... 55/316,
55/318, 55/387, 55/467
[51] Int. Cl.................................................... B01d 53/04
[50] Field of Search............................................ 55/316,
318, 383, 387, 491, 492, 437, 467

[56] References Cited
UNITED STATES PATENTS
2,038,071  4/1936  Wilhelm........................  55/316X

| 2,175,758 | 10/1939 | Neubert...................... | 55/467X |
| 2,994,404 | 8/1961 | Schifferly..................... | 55/316X |
| 3,217,471 | 11/1965 | Silverman.................... | 55/387X |

Primary Examiner—John Adee
Attorney—Drummond, Cahill & Phillips

ABSTRACT: A reactant element for use in air-treating apparatus, including a honeycomblike structure having contiguous channels, the longitudinal axes of which are disposed parallel to the direction of airflow, particulate reactant material disposed within the contiguous channels and a frame which, with the honeycomb structure, forms a unitary cartridgelike assembly which is fully self-supporting in the direction of the airflow.

INVENTOR
ELLIOT I. FELDMAN

INVENTOR.
ELLIOT I. FELDMAN

AIR-TREATMENT APPARATUS

This invention relates to air-treating apparatus.

More particularly, the invention relates to apparatus useful in many of the unit operations to which air is commonly subjected and in which it is necessary to achieve intimate contact between the air and one or more solid materials.

A further aspect of the invention concerns air-treatment apparatus which is particularly adapted for use in dehumidification, absorption, adsorption, sublimation, deodorization and similar operations in which the air is contacted with one or more solid particulate materials.

In a still further aspect, the invention concerns a novel reactant element adapted to be transversely disposed across a moving stream of air and which provides suitable intimate contact between the air and one or more reactants, yet which produces only a minimal pressure loss across the element.

In another respect, the invention concerns a novel reactant element which is lightweight, economically constructed and yet has substantial mechanical strength and resistance to deformation in the direction of the airflow.

In many unit operations, it is necessary to obtain intimate contact between air and one or more solid reactant materials to produce various changes in the physical or chemical condition of the air. For example, air is frequently subjected to dehumidification, absorption, adsorption, sublimation and deodorizing operations by passing an airstream through or otherwise intimately contacting the air mass with a solid material which may be porous or particulate. In the case of particulate solids, the contact may be accomplished by passing the air through a loosely packed stationary bed of the reactant, by mixing the air with finely divided particulate material which is later removed from the air by filtration, by the familiar fluidized bed technique, and by various other art-recognized expedients.

The selection of the particular apparatus in air-treatment operations is generally influenced by a number of factors such as, for example, the particle size and surface area of the solid particulate materials, the temperature of the air, and the allowable pressure losses across the air-treating apparatus. Of course, other considerations, aside from the technical features, may also importantly affect the choice of the method of air treatment and the particular apparatus involved. For example, size and weight limitations, cost of construction, mechanical strength and other similar factors frequently influence both the method of air treatment and the physical form of the apparatus employed.

More recently, self-contained or so-called "packaged" air-treating devices have become much more important. Concurrently, the problem of providing a suitable reactant element which can be quickly and conveniently removed and either regenerated or replaced has become increasingly significant. Specifically, such reactant elements should ordinarily be lightweight, have sufficient mechanical strength to be essentially self-supporting when interposed in a moving airstream, should avoid the problem of reactant "packing," should be inexpensively constructed to permit disposal and, of course, should induce a minimum pressure loss. Finally, and of especial importance where compactness of the air-treating unit is an important consideration, the reactant element should be capable of carrying more than one type of reactant where it is desired to treat the air either concurrently or serially with two or more reactants.

Accordingly, it is a principal object of the invention to provide improved air-treatment apparatus.

Another object of the invention is to provide a novel reactant element for use in air-treatment apparatus.

Still another object of the invention is to provide a novel air-treating reactant element which is especially adapted for use in self-contained or packaged air-treatment apparatus.

Another object of the invention is to provide an air-treating reactant element adapted to carry two or more different solid particulate reactants.

Another object is to provide a reactant element which is lightweight, inexpensively constructed and which is substantially self-supporting when interposed in a moving airstream.

These and other, further and more specific objects and advantages of the invention will become apparent to those skilled in the art from the following detailed description thereof taken in conjunction with the drawings, in which.

Figure 1:
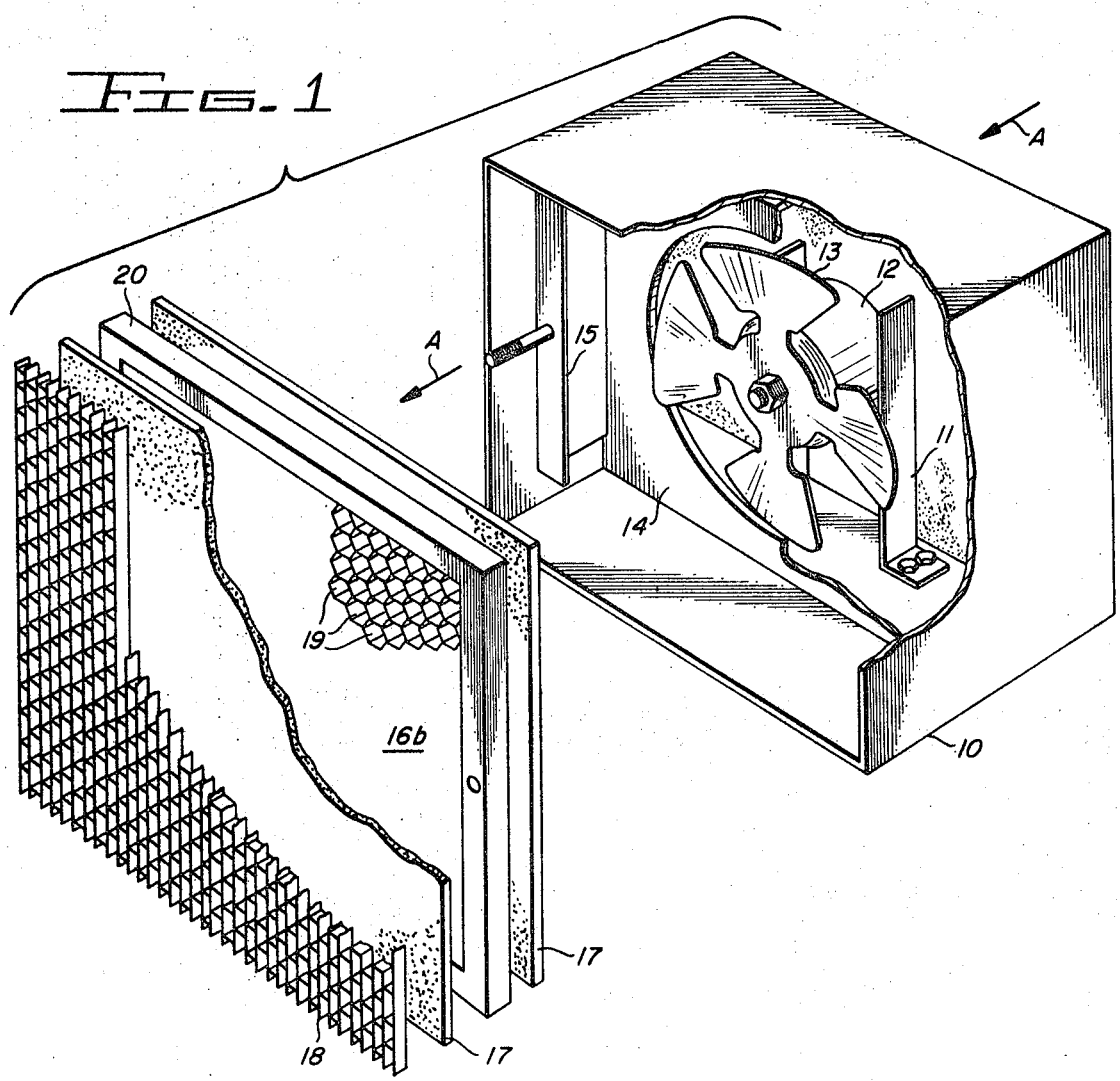
FIG. 1 is an exploded perspective view of an air-treatment apparatus incorporating a reactant element embodying features of the invention.

As used herein, the term "reactant" includes not only materials which actually react with the components of an airstream but also, in a broader sense, includes materials which do not chemically react with the components of the airstream but which act upon the stream to alter its overall chemical or physical characteristics. Thus, by way of illustration, and without limiting the generality of the term, the word "reactant" includes such diverse air-treatment materials as dessicants, absorbents and adsorbents such as silica gel, alumina and charcoal; sublimatory treating agents such as mothproofing agents, odor-masking or perfuming agents; as well as actual chemically reactive materials such as oxidative deodorizers or catalytic purifying agents. Also, as will be apparent to those skilled in the art, the term "reactant" when used in connection with the present invention, also includes active chemical agents adsorbed on or adsorbed in solid particulate substrates.

Briefly, in accordance with the invention, I provide a reactant element for use in connection with air-treating apparatus of the type which includes a duct member, means for effecting the movement of an airstream through the duct member and means for positioning a reactant element in the airstream. The reactant element comprises sheet means, having sufficient mechanical strength to be self-supporting in the direction of flow of the airstream, which sheet means define a plurality of elongate contiguous channels, the longitudinal axes of which are disposed substantially parallel to the direction of flow of the airstream; solid particulate reactant disposed in the channels; and frame means enclosing and supporting the periphery of the sheet means, forming with the sheet means a unitary cartridge element.

In a presently preferred embodiment of the invention, the sheet means comprise a honeycomb structure constructed of cardboard. The honeycomb structure is formed by bending individual sheets of the cardboard to form corrugations and then joining a plurality of such bent sheets disposed in parallel relationship and gluing or otherwise joining the parallel sheets at the tops of adjacent corrugations. The sheets, when thus joined, form a plurality of parallel contiguous channels with longitudinal axes thereof being parallel to the surface of the joined sheets. The honeycomb structure could similarly be constructed of sheets of thin metals or could be formed by extrusion of plastics or metals according to art-recognized techniques.

It will be understood by those skilled in the art that the particular cross section of the channels formed is not highly critical and could, for example, be triangularly or decussately shaped. Channels having a circular cross section may be employed but are not preferred since cylindrically shaped channels will have interstices which must either be filled with the reactant or must be blocked to avoid bypassing. Of course, blocking any significant portion of the cross-sectional area of the structure increases the resistance to airflow and one must either accept a larger pressure drop or provide a correspondingly larger overall surface area to compensate for blocking the space between circular channels. The methods of construction of the sheet means are known or readily available to the skilled artisan. For example, the sheet means may be constructed by the gluing technique mentioned above in connection with the honeycomb structure, by assembling slotted sheets in the manner of the familiar egg carton, by extrusion of metals or plastics, etc. It will, therefore, be apparent that the term "sheet means," as used herein, is not limited to structures constructed by joining individual sheets of thin material but also includes correspondingly shaped structures obtainable by extrusion or other plastics or metal-forming techniques. The desired characteristics of the sheet means are sufficient mechanical strength to be self-supporting in the direction of flow of the airstream and the provision of elongate contiguous channels with minimum edge area presented to the moving airstream to afford increased area for airflow and minimum pressure drop.

In structures embodying the present invention, the reactant is formed in discrete granules, pellets, beads or any other suitable discrete particulate shape such that they may be positioned within the channels of the sheet means in such a way as to provide acceptable contact with the airstream moving therethrough and yet provide sufficient free area to induce minimum pressure loss. Obviously, the particle size of the reactant must not be so small that it is physically entrained in the moving airstream, or so small that the reactant moves within the channel, forming a compact mass blocking the airflow. Selection of the proper granule or particle size can be accomplished by routine experimentation having regard for this disclosure and, since the proper particle size will depend upon allowable pressure drop, degree of contact required, net space velocity of the airflow, density of the granule, etc., it is impossible to place numerical limitations on the range of particle sizes which may be employed in all applications of the invention.

Figure 2:
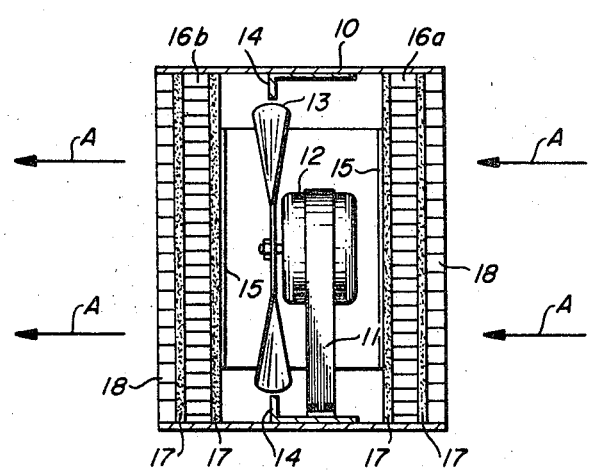
FIG. 2 is a cross-sectional view of the apparatus of FIG. 1 showing reactant elements embodying the present invention in operative position.

Turning now to the drawings, in which various embodiments and applications of the invention, chosen for purposes of illustration, are depicted, FIGS. 1 and 2 illustrate a portable deodorizing apparatus in which reactant elements embodying the present invention are advantageously employed. The device consists of a duct member 10 in the form of a rectangularly shaped channel constructed of sheet metal, plastic, or other suitable material. The duct carries a mounting bracket 11 for an electric motor 12 powering a fan or propeller blade 13 which blows an airstream in the direction of the arrows A through the duct member 10. The blade is suitably shrouded by means of a baffle 14 carried by the duct 10 to increase the efficiency of the fan 13. Shoulders 15 provide an abutting surface which positions the reactant elements 16, sheets of foamed rubber or plastic diffuser material 17, and a decorative grille 18 within the duct member 10. The diffuser members may serve several purposes, such as, masking the sound of the fan and motor, retaining the particulate reactant within the channels 19 of the reactant element 16, and in appropriate instances may filter suspended materials from the air. The reactant element 16 is constructed of cardboard honeycomb material, the periphery of which is enclosed by a metal or plastic frame 20 to form a unitary cartridge element which may be conveniently replaced or removed for recharging. The reactant material, in the form of pellets of alumina impregnated with potassium permanganate, is disposed within the channels 19 and retained therewithin by means of the diffuser members 17. In operation, the fan draws air through the rear reactant element 16a through the duct 10 and forces it out through the front reactant element 16b, thereby contacting the air with the deodorizing reactant and oxidizing odoriferous components to unobjectionable compounds.

Figure 3:
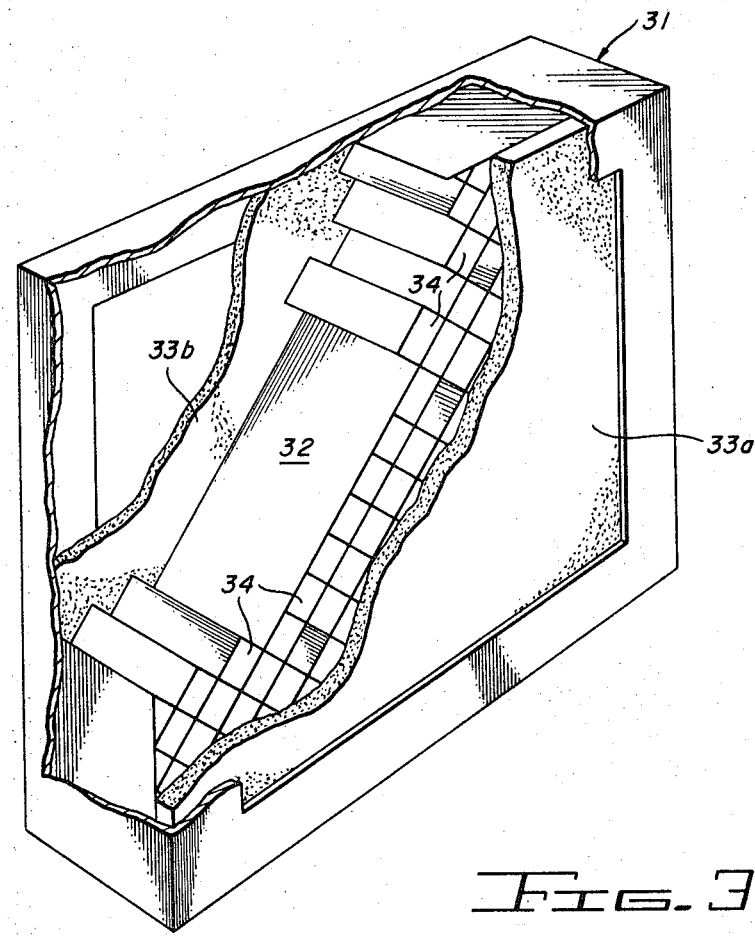
FIG. 3 is a cutaway perspective view of a reactant element embodying the invention showing the manner of disposition of the reactant within the element.

FIG. 3 illustrates an embodiment of the invention in which the sheet means form a decussated structure providing diamond-shaped channels. This structure may be conveniently manufactured by extrusion of a suitable plastic such as polyvinylchloride or a suitable metal such as aluminum. In the embodiment of FIG. 3, the metal frame 31 encloses both the sheet means 32 and a pair of foamed rubber diffusing screens 33a and 33b which serve to retain particulate reactant materials within the channels 34 of the sheet means 32. The reactant element of FIG. 3 could be conveniently employed in the apparatus of FIGS. 1 and 2, replacing the separate reactant elements 16a and 16b and their associated diffusing screens 17.

Figure 4:
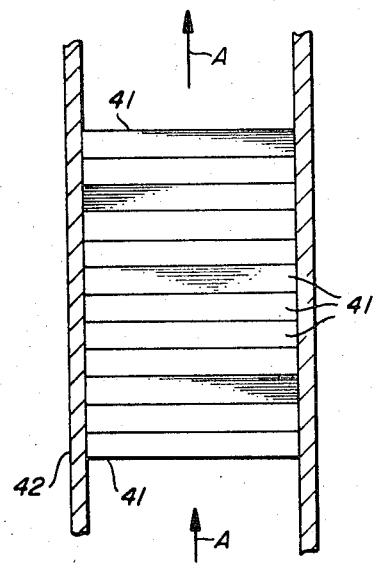
FIG. 4 is a sectional schematic view illustrating how a plurality of reactant elements embodying the invention may be assembled to treat a vertically moving column of air while avoiding "packing" of the particulate reactant.

In FIG. 4, I schematically illustrate an apparatus in which a plurality of the reactant elements 41 of FIG. 3 are vertically stacked within a duct member 42 in the path of airstream A. In this way, one can avoid the tendency encountered in packed columns of the reactant material to settle or to be displaced, forming channels which permit the airstream to move the duct 42 without sufficient contact with the reactant material. Obviously, the provision of a plurality of reactant elements 41 also facilitates quick replacement or removal for regeneration of the reactant material.

The reactant elements described hereabove can also be employed to effect a wide variety of vapor phase reactions and are not necessarily limited to use in air treatment, although such constitutes the presently preferred and developed use of such elements. For example, in many chemical reactions, it is desired to introduce two or more reactants into separate carrier or reactant gases, and then carry out a vapor phase reaction between these components. My apparatus provides a convenient and effective method for carrying out such reactions in that a single stream of carrier gas can be enriched with two or more reactants and the reaction thereafter completed in the vapor phase as the enriched streams emerge from the separate contiguous channels. For example, in this case it would be possible to prepare in situ a transitory or easily degradable intermediate product which could then be immediately available to perform its intended function. Illustratively, a transitory or easily degradable deodorizing or disinfecting chemical, which could not be conveniently produced, stored and transported, could nevertheless be produced in situ for use in immediate deodorizing or disinfecting operations within a closed room.

Various changes and modifications of the invention can be made and, to the extent that such variations incorporate the spirit of the invention, they are intended to be included within the scope of the appended claims.

I claim:

1. A reactant element for air-treating apparatus, said apparatus including:
   a duct member,
   means for effecting the movement of an airstream through said duct member, and
   means for positioning a reactant element in said airstream,
   said reactant element comprising:
   a. sheet means, having sufficient mechanical strength to be self-supporting in the direction of flow of said airstream, defining a plurality of elongate contiguous channels having longitudinal axes thereof disposed substantially parallel to the direction of flow of said airstream;
   b. solid particulate reactant disposed in and across said channels; and
   c. frame means enclosing the periphery of said sheet means, forming therewith a unitary cartridge element, such that said contiguous channels are disposed to permit substantially unidirectional flow of said air through said duct and cartridge element.

2. Reactant element of claim 1 having at least two different particulate reactants disposed in parallel in said channels.

3. Reactant element of claim 1 having at least two different particulate reactants disposed in series in said channels.